United States Patent [19]

Koller

[11] Patent Number: 4,511,235

[45] Date of Patent: Apr. 16, 1985

[54] SIMPLIFIED PAPER LOADING MECHANISM

[75] Inventor: Thomas J. Koller, West Linn, Oreg.

[73] Assignee: Tektronix, Inc., Beaverton, Oreg.

[21] Appl. No.: 446,883

[22] Filed: Dec. 6, 1982

[51] Int. Cl.³ .................. G03B 27/00; G03G 15/00
[52] U.S. Cl. .......................................... 355/1; 355/13; 355/3 SH
[58] Field of Search ................ 355/1, 3 R, 3 SH, 28, 355/12, 13, 29, 99; 226/91, 92, 183, 188; 242/55, 53

[56] References Cited

U.S. PATENT DOCUMENTS

| | | | |
|---|---|---|---|
| 3,395,610 | 8/1968 | Evans et al. | 355/13 |
| 3,428,267 | 10/1966 | Briles | 242/55.53 |
| 4,107,710 | 8/1978 | Harvey | 354/86 |
| 4,116,557 | 9/1978 | Kushima et al. | 355/1 X |

Primary Examiner—L. T. Hix
Assistant Examiner—Douglas S. Lee
Attorney, Agent, or Firm—John H. Bouchard; Allston L. Jones; Robert S. Hulse

[57] ABSTRACT

A paper loading mechanism for a copier or the like is disclosed. A paper guide member and a foam pressure roller rotatably coupled to a paper drive roller feeds a web of paper to the drive roller, thereby semi-automatically feeding the paper along a predetermined path. A paper canister, having the webs of paper disposed therein, is affixed to a front cover of said paper loading mechanism. This structural arrangement simplifies the procedure of loading paper into the paper loading mechanism of the present invention.

11 Claims, 8 Drawing Figures

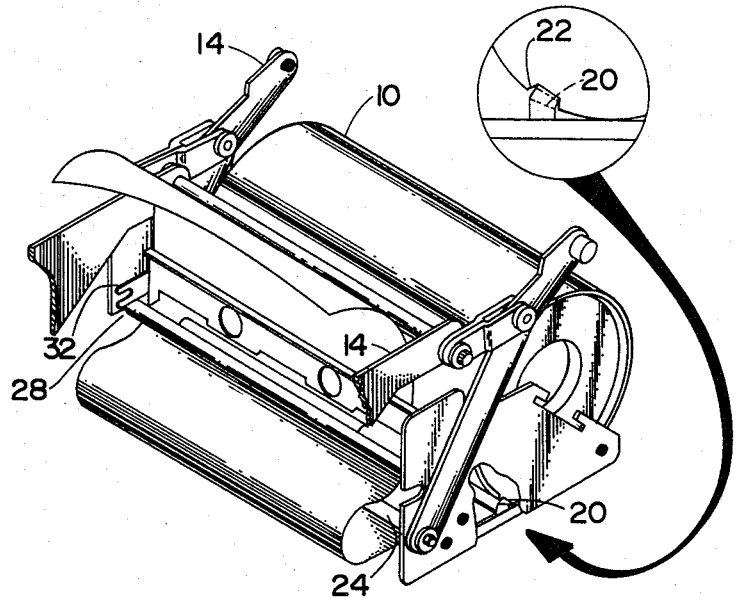
FIG. IA.
(PRIOR ART)
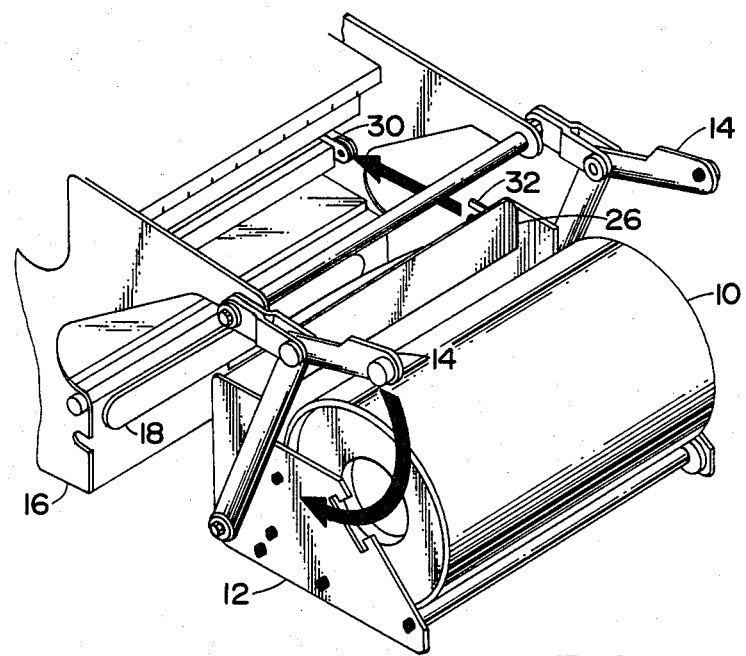
FIG. IB.
(PRIOR ART)

FIG. 5.
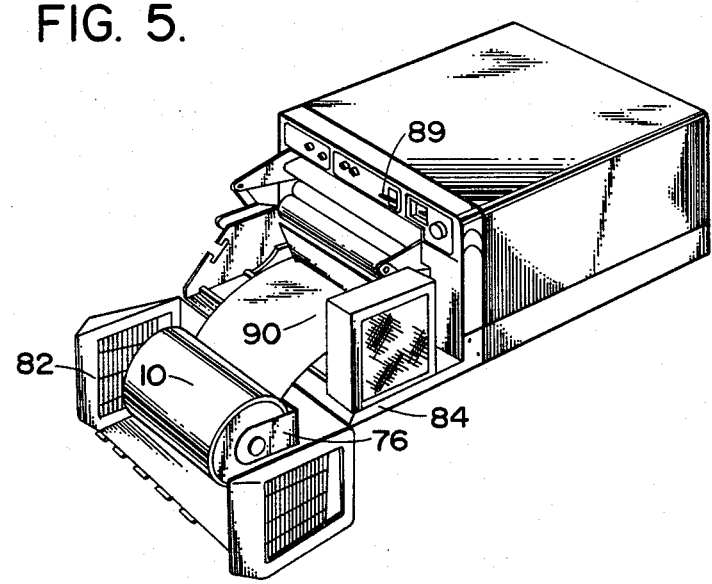
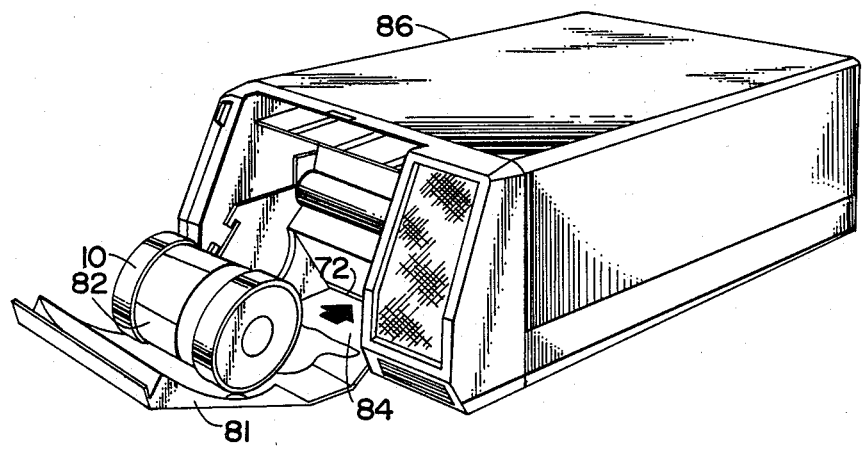
FIG. 6.

SIMPLIFIED PAPER LOADING MECHANISM

BACKGROUND OF THE INVENTION

1. Field of the Invention

This invention pertains generally to a copying apparatus, more specifically, to a paper loading mechanism for said copying apparatus.

2. Description of the Prior Art

A copying apparatus is a hard-copy unit used for making a hard-copy of an image displayed on a cathode ray tube (CRT) screen or of an image supplied from other image sources. A hard copy unit includes, in general, a fiber optic tube (FOT) and a roll of sensitized paper. A sensitized surface of the sensitized paper is pressed against a surface of the FOT and is moved in one direction as an electron beam generated within the FOT is periodically scanned in a direction perpendicular to said one direction while modulating a beam current or an intensity of said electron beam in response to an image signal. The sensitized paper is exposed to light, and is then heat developed as the paper passes through a processing section of said hard copy unit.

A typical example of a conventional hard copy unit is disclosed in U.S. Pat. No. 3,679,824 to Gibson Jr. and in U.S. Pat. No. 3,811,007 to Unger, both of the above patents being assigned to the assignee of the invention disclosed in this application. The processing section of the hard copy unit is disclosed in U.S. Pat. No. 3,864,709 to Bruns assigned to the assignee of the invention disclosed in this application. A prior art loading mechanism for loading the sensitized paper into the conventional hard-copy unit is disclosed in an instruction manual associated with Tektronix continuous recoder, model 4633A, and associated with video hard copy unit, model 4632.

The prior art paper loading mechanism associated with the conventional hard copy unit is illustrated in FIGS. 1A and 1B. FIG. 1A is a perspective view of the paper loading mechanism seen from the back or from the FOT side. FIG. 1B is a perspective view of an unlocked paper loading mechanism when loading or unloading a roll of the sensitized paper thereon. Such sensitized paper is mounted on a light shielded paper canister 10, the canister 10 being placed on a cassette assembly 12. The cassette assembly 12 includes cassette handles 14. Using cassette handles 14, the cassette assembly 12 will slide away from mainframe 16 and away from many other electrical and mechanical parts and components, including the FOT and its faceplate 18. When the cassette assembly 12 is positioned away from mainframe 16, an operator will have access to an expended canister 10 for removal thereof and will load a new paper canister 10 therein. Cassette assembly 12 further includes a paper locator 20 for engaging into a paper exit slot 22 on the canister 10, a paper roller 24, a paper guide 26, a knife assembly 28, a pin 30, and a fork 32. Although not shown in FIG. 1, a front cover is hinged at the bottom of mainframe 16 for known purposes.

For a better understanding of the conventional hard copy unit, reference is directed to FIG. 2 which illustrates a side cross sectional view thereof. The paper from the paper exit slot 22 of canister 10 is bent by a metal idler roller 24, by drive roller 36 mounted on mainframe 16, and by a pinch roller 38 mounted on cassette assembly 12. There exists, between idler roller 24 and drive roller 36, a faceplate 18 of the FOT and a foam pressure roller 34 which presses the paper against the faceplate 18. The paper further advances through a knife assembly 28, including a stationary blade 28a and a rotary blade 28b, through a processor assembly 40, including a processor belt 42, belt rollers 44 and a heating panel 46, around an ejector roller 48 adjacent a processor rear paper guide 50 and through a conveyor 52.

The following paper loading procedure is utilized by the conventional hard-copy unit:

1. Open the front cover.
2. Push handles 14 down and pull out cassette assembly 12.
3. Remove the expended canister 10, if any.
4. Tear off the metallic light seal tape from the new paper canister 10 using the paper exit slot 22 and pull out approximately 12 inches of paper.
5. Insert paper under metallic roller 24.
6. Holding tension on paper canister 10, place it into the frame of a paper cassette assembly 12. Rotate the paper canister 10 until a locator 20 is engaged with paper exit slot 22 on paper canister 10.
7. Pull a paper guide 26 forward. Thread paper up through knife assembly 28 and out the top of paper guide 26. Pull excess paper tight over the front of the unit.
8. Push cassette assembly 12 in until it stops. Be sure that pin 30 is engaged by fork 32.
9. Lift both handles 14 and lock firmly in place.
10. Close the front cover.

This paper loading mechanism and the procedure utilized thereby is excessively complicated and is sometimes very dangerous to use as a result of the sharp knife edge of knife assembly 28, the knife edge sometimes injuring the operator during the paper loading process. In addition, improper paper loading often results in paper jams. Further, mechanical failures often result in system failure. As a result, frequent service calls are required.

SUMMARY OF THE INVENTION

For simplifying the paper loading mechanism and avoiding such improper paper loading and mechanical failures, guides are provided at the entrance of the paper loading mechanism wherein the sensitized paper is loaded into the hard-copy unit of the present invention. In addition, a drive gear is provided to drive a roller which seizes the sensitized paper and pushes the paper into engagement with the drive rollers. In this way, the sensitized paper is properly guided into engagement with the drive rollers, thereby avoiding the difficult paper loading procedure described hereinbefore and the improper paper loading which results as a result thereof. The paper canister may be snapped directly onto a front cover in one preferred embodiment of this invention.

It is therefore an object of this invention to provide a simplified paper loading mechanism for a hard-copy unit.

It is another object of this invention to provide an improved paper loading procedure associated with the simplified paper loading mechanism for the hard-copy unit.

It is still another object of this invention to provide a more reliable paper loading mechanism.

Further scope of applicability of the present invention will become apparent from the description given hereinafter, however, it should be understood that the details of the description and the specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

Various features and advantages of the present invention will become more apparent upon consideration of the following detailed description when taken in conjunction with the accompanying drawings, and wherein:

FIGS. 1 and 2 illustrate simplified perspective and cross sectional views of a prior art paper loading mechanism;

FIGS. 4 and 5 illustrate a simplified cross sectional view and a perspective view, respectively, of the paper loading mechanism shown in FIG. 3; and FIG. 6 illustrates a perspective view of a hard-copy unit incorporating another embodiment of the present invention.

DETAILED DESCRIPTION OF THE PREFERRED EMBODIMENTS

Figure 2:
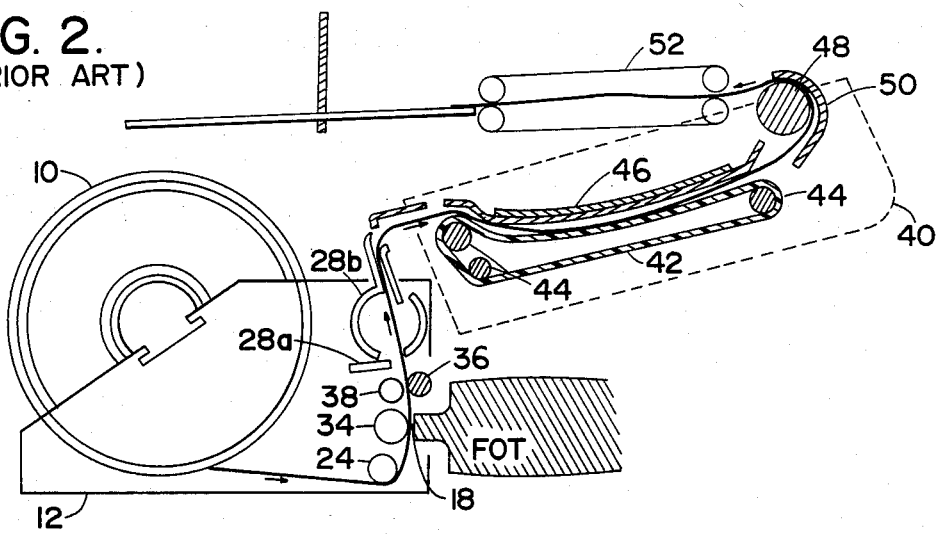
Figure 4:
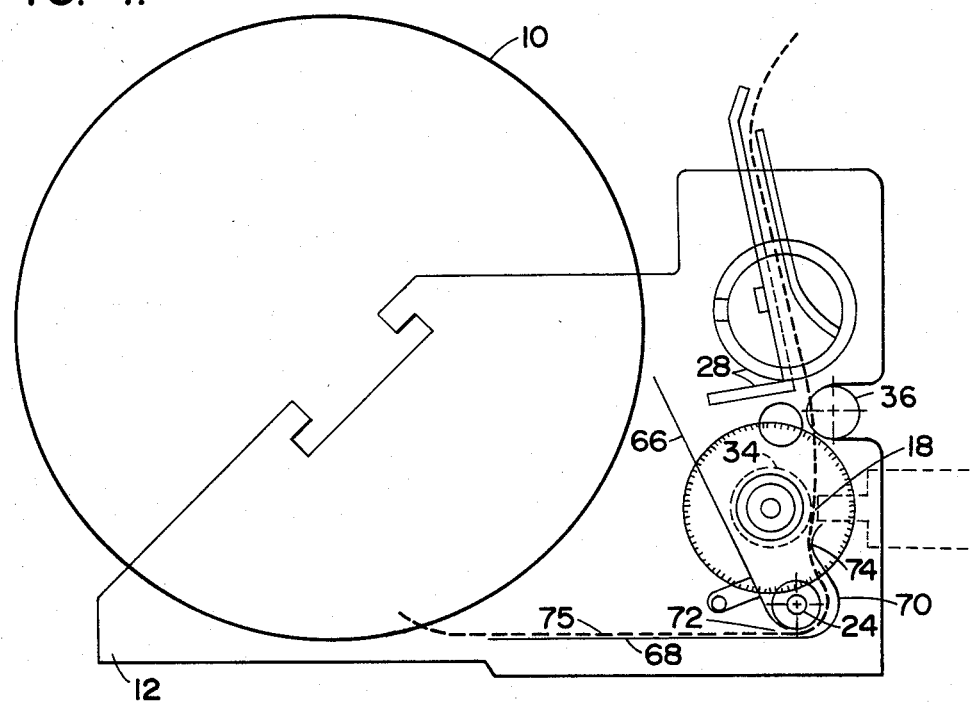
Figure 3A:
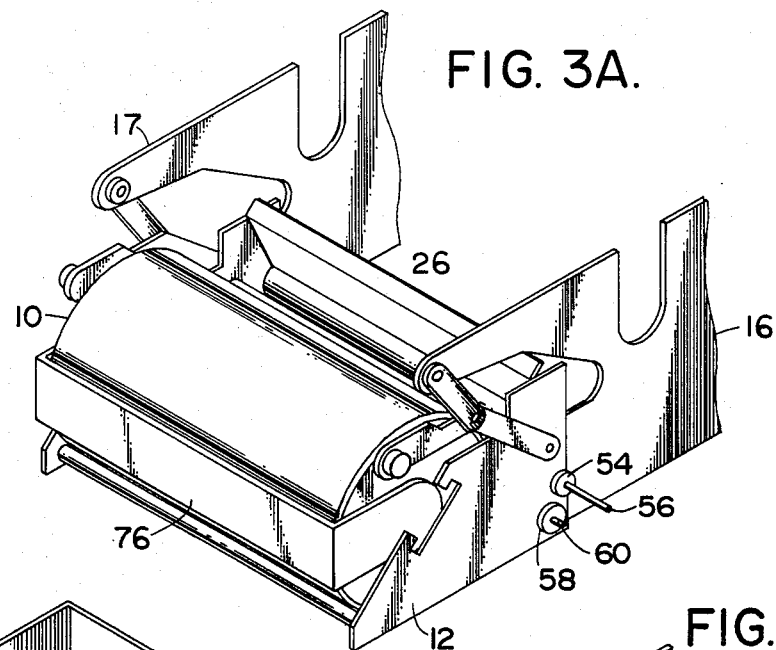
FIGS. 3B and 3A illustrate disassembled and assembled perspective views, respectively, of the paper loading mechanism according to one embodiment of the present invention.
Figure 3B:
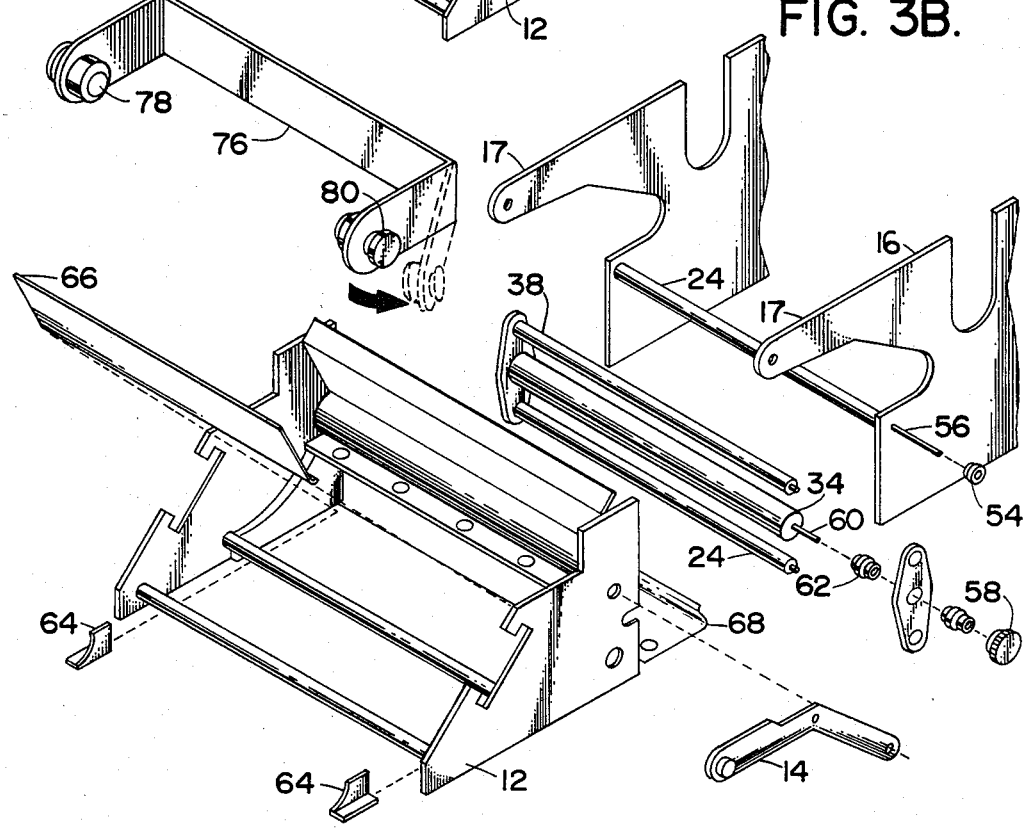

One preferred embodiment of the paper loading mechanism according to the present invention will be described by reference to FIGS. 3A and 3B illustrating respectively, an assembled and a dissembled perspective view and by reference to FIGS. 4 and 5 illustrating respectively a cross sectional side view and a perspective view thereof. The preferred embodiment illustrated in FIGS. 3A and 3B differs from the conventional paper loading mechanism of FIGS. 1 and 2 in many ways. Only the differences are discussed in detail hereunder. One of the most significant differences between the paper loading mechanism of FIG. 3A relative to the mechanism shown in FIGS. 1 and 2, is the use of a gear mechanism which comprises driving gear 54 and driven gear 58. As shown in FIGS. 3A, 3B, driving gear 54 is coupled to shaft 56 of paper driving roller 36 and is rotatably mounted at the front end portion of mainframe 16. Driven gear 58 is coupled to shaft 60 of foam pressure roller 34. Shaft 60 is mounted by bearing 62 on paper cassette assembly 12. When cassette assembly 12 is in a proper operating position, driving gear 54 and driven gear 58 are functionally engaged into rotation.

As shown in FIG. 5, the paper loading mechanism includes a front cover 82 and a paper canister 10 having a roll of paper disposed thereon. The canister 10 is mounted onto the front cover 82 via a canister holder 76. When the front cover 82 is opened, the cover rotates via a hinge on mainframe 84, and the paper canister 10, held to cover 82 by canister holder 76, rotates therewith. Since the paper canister 10 is held firmly to cover 82 by canister holder 76, the loading of paper from canister 10 into the paper loading mechanism of the present invention is more easily accomplished relative to the loading of paper into a prior art paper loading apparatus.

Another difference between the paper loading mechanism of FIG. 3A relative to the mechanism shown in FIGS. 1 and 2 is the use of a paper guide means situated at the paper entrance or guide chute of the paper cassette assembly 12. Referring to FIGS. 3B and 4, the paper guide means comprises side paper guides 64, front paper guide 66 and guide tray 68. The front paper guide 66 is sloped down very close to guide tray 68 adjacent idler roller 24 in order to provide a narrow paper entrance 72. Guide tray 68 is generally flat in shape. However, the guide tray 68 has a shape which may be characterized as crooked at the rear end thereof, along the circumference of idler roller 24 and at the end portion 74, in order to touch foam roller 34 and the faceplate 18 of the FOT. Therefore, the guide tray 68 is "S-shaped" in cross section. When the paper from paper canister 10 is gently fed into paper entrance 72, it passes through a clearance between idler roller 24 and paper guide tray 68 and is bent upwardly at a crooked portion 70. The foam roller 34 presses the paper against the faceplate 18 of the FOT. The paper then passes the cutter blade assembly 28 and the processor assembly 40. The path traversed by the paper is shown by dashed line 75 illustrated in FIG. 4.

To summarize the function of the paper guide means, front paper guide 66 enables the operator to properly feed the paper into the hard copy unit. Paper guide tray 68 guides the paper up to foam roller 34, the foam roller pressing the paper against the faceplate 18 of the FOT. As a result, the paper is automatically fed through the hard-copy unit.

As mentioned hereinabove, the paper canister holder 76 is used to hold paper canister 10 in position. As is shown in FIG. 1, paper canister 10 has a dry-silver recording paper mounted thereon, the recording paper being a 3m company product. The canister 10 is a spindle arrangement having a center hole at both ends thereof. Paper canister holder 76 is a "]"-shaped resilient metal plate including cylindrical portions 78 at both ends thereof located inside a bent portion and knobs 80 at both ends thereof located at the opposite or outer sides of cylindrical portions 78. Cylindrical portions 78 are adapted to mate with the center holes at both ends of paper canister 10 for holding it in position. Paper canister holder 76 is used to hold the paper canister and to lock it into its proper orientation with respect to the remainder of the hard copy unit.

The new paper loading procedure associated with the paper loading mechanism of the present invention is as follows:

1. Open the front cover. The paper canister 10 is mounted to front cover 82.
2. Remove paper canister 10 if no further paper is disposed thereon.
3. Replace with a full paper canister 10 after tearing off the metallic light seal tape at paper exit slot 22 and pull out several inches of paper.
4. Push a "cut/rec" switch 89 (see FIG. 5) to initiate the loading of paper into the paper loading mechanism of the present invention. Feed the paper into the paper slot. Continue feeding the paper therein until the mechanism automatically pulls said paper.
5. Close the cover.

The new paper loading mechanism and procedure utilized thereby is less complicated and requires less paper loading time relative to the prior art paper loading mechanism, because the paper is automatically loaded and thereby automatically travels along the paper path shown in FIG. 4. The automatic loading of the paper is accomplished by simply feeding the paper into the guide chute. This automatic paper loading procedure is of course realized by the use of a well designed paper guide means and a gear mechanism to rotate the foam roller 34.

Reference is now directed to FIG. 6 illustrating a perspective view of a hard-copy unit incorporating another embodiment of the present invention. This embodiment differs from the aforementioned embodiment in that the paper canister 10 is mounted directly on front cover 81 by resilient mounting member 82. The paper from paper canister 10 is then fed into the guide chute in a direction illustrated by arrow 84 while rotating drive roller 36. The paper is semi-automatically fed by the paper guide and the gear member of a similar design as illustrated in FIGS. 3B and 4. The paper loading mechanism associated with the embodiment shown in FIG. 6 and the paper loading and unloading procedure utilized thereby is much simpler than the paper loading mechanism and procedure associated with the embodiment shown in FIGS. 3B and 4 because the paper driving mechanism is unitary or integrated and the resilient mounting member 82 mounted on the front cover 81 is the only movable part required for paper canister replacement. It should be noted that front cover 81 is hinged at the bottom of mainframe 86. Consequently, the paper guide chute 72 is closer to the paper exit slot of paper canister 10. As a result, the steps and the time required to load and unload paper is significantly reduced utilizing the embodiment shown in FIG. 5, relative to the embodiment shown in FIGS. 3B and 4. In addition, the amount of wasted paper required for initial paper loading associated with the paper loading mechanism of this embodiment is also minimized as compared with the mechanism in the other embodiments of the invention and with the prior art paper loading mechanism.

While the best mode presently contemplated for practicing the invention has been set forth, it will be appreciated that various changes and modifications are possible within the ambit of the above teachings. It is therefore to be understood that the scope of the invention is limited only as required by the express terms of the appended claims.

What I claim as novel is:

1. A paper loading mechanism for a copier for loading a continuous web of paper from a paper canister through a predetermined path, comprising:
    cassette holder means for holding said paper canister in a predetermined position;
    roller means including at least a paper drive roller means for feeding the paper into said copier and a foam roller means for pressing the paper against an image forming means of said copier, said drive roller means and said foam roller means being mechanically coupled together; and
    paper guide means positioned intermediate said cassette holder means and said drive roller means for properly guiding the paper from said cassette holder means to said drive roller means, one part of said paper guide means being in contact with said foam roller means for feeding the paper to said drive roller means.

2. A paper loading mechanism according to claim 1 wherein said cassette holder means is located within the mainframe of said copier, said driving roller means and said foam roller means being respectively provided in said mainframe, said cassette holder means said drive roller means and said foam roller means being coupled together by a gear means.

3. A paper loading mechanism according to claim 1 further including a hinged front cover.

4. A paper loading mechanism according to claim 3 wherein said cassette holder means is mounted on the front cover.

5. A paper loading mechanism according to claim 1 wherein said paper guide means includes a sloped front paper guide and a guide tray to provide a guide chute, the rear end of said guide tray contacting said foam roller means.

6. A paper loading mechanism according to claim 1 wherein said cassette holder includes a spindle type cassette holder.

7. A paper loading mechanism according to claim 1 further including a paper cutting knife.

8. A copier, comprising:
    a paper cassette containing a roll of sensitized paper in a canister;
    a fiber optic tube for exposing said sensitized paper with light modulated by a recording image;
    paper feeding means for feeding said sensitized paper at a predetermined speed in contact with the faceplate of said fiber optic tube; and
    processing means for heat processing said sensitized paper after the exposure to the light of said fiber optic tube;
    said paper feeding means including a paper drive roller, a foam roller rotatively coupled to said driver roller, and paper guide means for guiding the paper from said canister to said paper drive roller, said paper guide means includes at least a sloped front paper guide and a paper tray curved at the rear end thereof to contact said foam roller and the faceplate of said fiber optic tube.

9. A copier according to claim 8, wherein said copier includes:
    a mainframe containing said fiber optic tube, said processing means and said drive roller; and
    a paper cassette holder section containing said paper cassette, said foam roller and said paper guide means.

10. A copier according to claim 8 further comprising a hinged front cover.

11. A copier according to claim 10 wherein said paper cassette is mounted on said front cover, said paper feeding means being implemented as a unitary member with respect to the remainder of said copier.

* * * * *